United States Patent [19]

DeMar

[11] Patent Number: 5,257,179
[45] Date of Patent: Oct. 26, 1993

[54] AUDIT AND PRICING SYSTEM FOR COIN-OPERATED GAMES

[75] Inventor: Lawrence DeMar, Chicago, Ill.

[73] Assignee: Williams Electronics Games, Inc., Chicago, Ill.

[21] Appl. No.: 776,088

[22] Filed: Oct. 11, 1991

[51] Int. Cl.$^5$ .................... G06F 15/28; G06K 5/00
[52] U.S. Cl. ........................... 364/410; 273/138 A; 273/143 R; 273/85 CP; 273/85 G
[58] Field of Search .................... 364/410; 273/138 A, 273/143 R, 85 CP, 85 G

[56] References Cited

U.S. PATENT DOCUMENTS

| | | | |
|---|---|---|---|
| 4,072,930 | 2/1978 | Lucero et al. | 364/411 |
| 4,216,461 | 8/1980 | Werth et al. | 340/149 R |
| 4,335,809 | 6/1982 | Wain | 273/138 A |
| 4,575,622 | 3/1986 | Pellegrini | 235/282 |
| 4,607,844 | 8/1986 | Fullerton | 273/143 R |
| 4,948,138 | 8/1990 | Pease et al. | 273/138 A |

FOREIGN PATENT DOCUMENTS 2211975 7/1989 United Kingdom ........... 273/138 A

Primary Examiner—Roy N. Envall, Jr.
Assistant Examiner—Gita D. Shingala
Attorney, Agent, or Firm—Rockey, Rifkin and Ryther

[57] ABSTRACT

An audit system for recording the activation of coin-operated electronic equipment and the amounts of money collected employing a real-time clock to time stamp information recorded in non-volatile or battery powered memory, such as total collections, number of games played, etc. The system also allows selective pricing based on a time of day schedule.

3 Claims, 6 Drawing Sheets

AUDIT AND PRICING SYSTEM FOR COIN-OPERATED GAMES

BACKGROUND AND OBJECTS OF THE INVENTION

The present invention relates to a system for providing accurate and tamper-resistant information on the financial performance of coin-operated equipment, such as pinball machines and video games.

Coin-operated games are found in arcades, restaurants and taverns throughout the world. In a typical operating environment, the owner of the premises provides space for the game in exchange for a percentage of the revenue generated by it. The game owner or operator is responsible for maintaining the game in operating condition, and for collecting the money deposited into the game by players. Operators typically hire "collectors" to perform these functions, as well as service technicians to perform repairs.

Presently, the owners obtain information about the number of games played (or similar usage statistics) and the amounts of revenue received by reading information from mechanical or electronic meters in the game. Because these meters do not record when the information displayed was first recorded, there is no way for an operator to discern whether the number of plays has been altered, thereby leading to inaccurate reporting of game financial performance. The ability to tamper with the counters or meters without detection has led to abuse by unscrupulous collectors and service personnel who may decrease the number of games played in order to collect the unreported portion of the game revenue.

By providing a system to reduce the risk of tampering by unscrupulous individuals, accurate data can be obtained from the equipment, permitting proper and full allocation of revenue to the operator and the owner of the site at which the equipment is installed. Also, a better picture of game activity is obtained.

Accordingly, it is an object of the invention to provide an audit system for coin-operated equipment that is relatively tamper-resistant as compared to previous audit systems.

It is another object of the invention to make the audit system easy to use by operators and collectors.

Still another object of the invention is to provide such an audit system in the form of a menu driven system wherein the user interacts with the equipment based upon information supplied in a visual display.

Yet another object of the invention is to provide such an audit system having the capability to alter game features such as game difficulty, pricing and other attributes such as sound volume, match award percentage, score required for a free replay based on the time of day, day of the week, volume of play and similar criteria.

These and other objects of the invention will become apparent to those skilled in the art when the following detailed description of the invention is read in conjunction with the accompanying drawings.

SUMMARY OF THE INVENTION

The present invention provides a tamper-resistant system for recording revenue and game play statistics (bookkeeping totals) for coin-operated electronic games and similar equipment, and for accurately reporting such information to the game operators and collectors, thereby to reduce the likelihood of misappropriation of game revenue and to provide detailed game statistics.

According to the present invention, an audit system is provided comprising a microprocessor for operating an amusement game, a clock for generating a real-time output in response to signals generated by the processor means and memory means for recording the occurrence of various events, such as the number of games played, the insertion of coins, opening of the coin door, collection of money from the coin box, resetting of the system clock and various game statistics.

The system also allows the operator to selectively cause operational changes based on a schedule set by the game operator or derived by the game software based on play statistics such as high scores, number of games played per day, percentage of free games awarded, popular days of the week, etc.

DETAILED DESCRIPTION OF THE INVENTION

The present invention may be applied to any type of electronic coin-operated equipment, including pinball and video arcade games, jukeboxes, and the like, in which information regarding play/use statistics and financial performance are frequently reported and/or audited. Those skilled in the art will understand that the following description of the present invention, as installed in a pinball game, can be readily translated to other coin-operated, electronic equipment.

Figure 1:
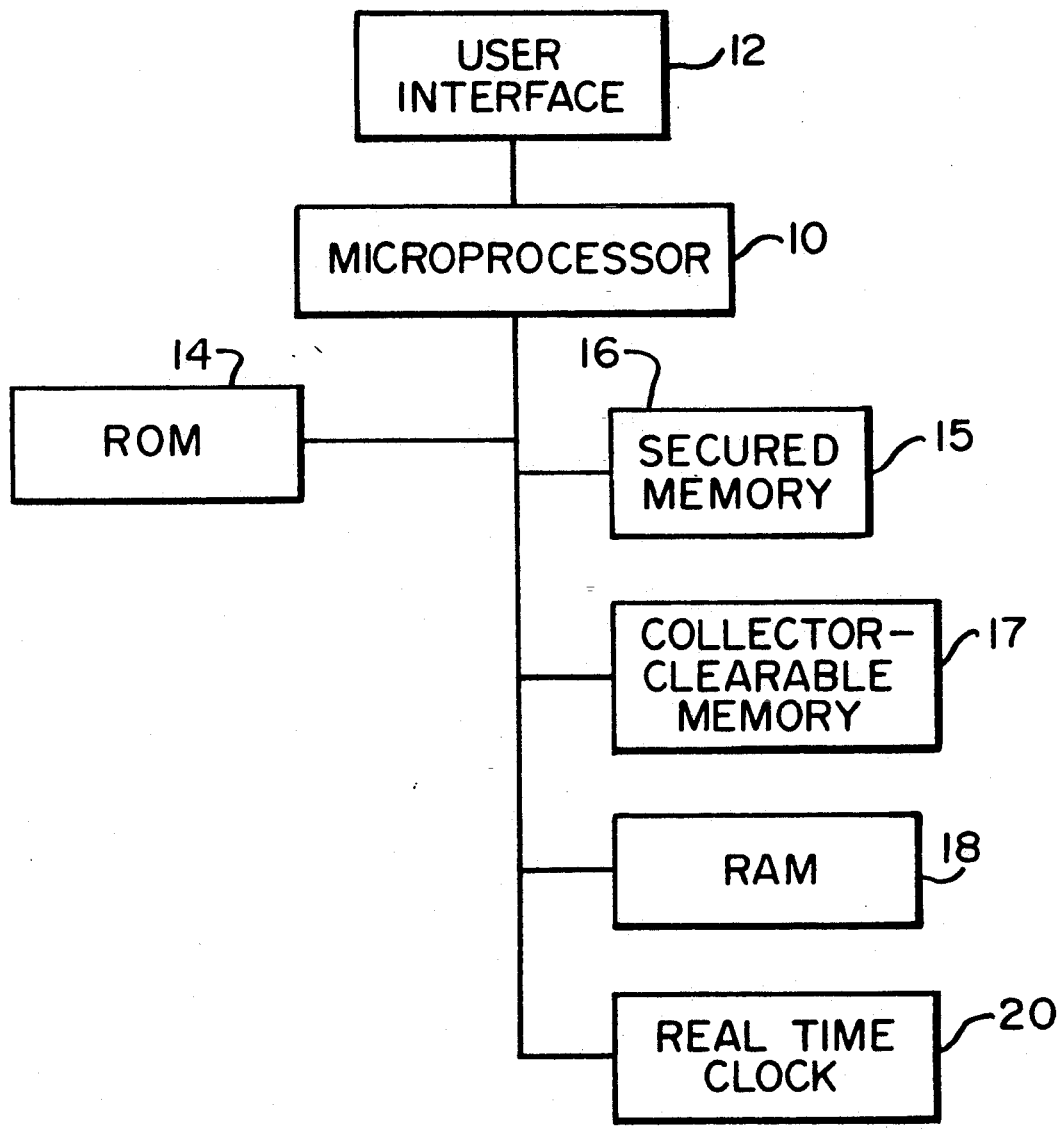
FIG. 1 is a block diagram representing the audit control system of the present invention.

Referring to FIG. 1, it is common for pinball games to include a microprocessor 10 for executing operating commands based upon information received through a user interface 12. The user interface 12 may include combinations of push buttons, joysticks, levers, and/or the playfield features of a game, and typically includes an alpha-numeric display for communicating with the user. The display may be the same as that employed to provide user instructions, scoring information, or visual "attract mode" attributes to encourage potential players to start the game.

Software operating instructions for carrying out the operation of the game are typically, but not necessarily, stored in a non-volatile ROM associated with the microprocessor 10 via a bus 16. Other parameters for operating the game may be stored in a volatile RAM 18 or in other non-volatile memory, such as electronically erasable programmable read-only memory (EEPROM), or battery backed-up RAM.

In order to secure certain information connected with the financial performance of the game, a segment of memory ("audit memory") is provided that is non-volatile (EEPROM or battery backed RAM). Storage of audit information in this manner maintains this information even when the game power is turned off as is often the case at the end of each business day, when the game is being serviced, or when the game is moved to a new location. If the information is stored in battery backed RAM, the battery should be located in a locked area of the game cabinet not accessible to money collectors or service technicians to reduce unauthorized tampering with the audit information.

In sum, the audit memory includes a secured segment which is protected against loss of power and unauthorized alteration. In addition, another segment of audit memory may be provided which includes not only the secured memory 15 but also a collector-clearable memory 17. The purpose of this bifurcation will be described hereinafter.

A real-time clock 20 is provided to operate in conjunction with the microprocessor and the memory means used to store the audit information. Certain data input to the microprocessor, or output therefrom, is stored in the audit memory, and is "time stamped" (i.e. the time of the data storage is stored with the data) based upon information obtained from the real-time clock. This time-stamping operation is controlled by the operating software stored in the ROM 14 and executed by the microprocessor 10. This time stamp procedure insures audit integrity and permits easy detection of tampering. Both data and events are time stamped. Events include opening of various doors, such as the coin door, service panel, clearing of scores and audit totals.

The real-time clock 20 typically comprises an oscillator having a known frequency. The time and date are calculated according to a software routine whereby the number of oscillations since the start-up of the equipment is counted an converted into a time value. This time value is added to a value stored as the time the equipment was first activated. Such calculations, and software routines for performing those calculations, are well-established in the art. In order to insure that the time is correctly calculated, and that real-time clock operations will be unaffected by power loss, the real-time clock may be provided with a battery back-up that operates the clock even when the game is off.

Figure 2:
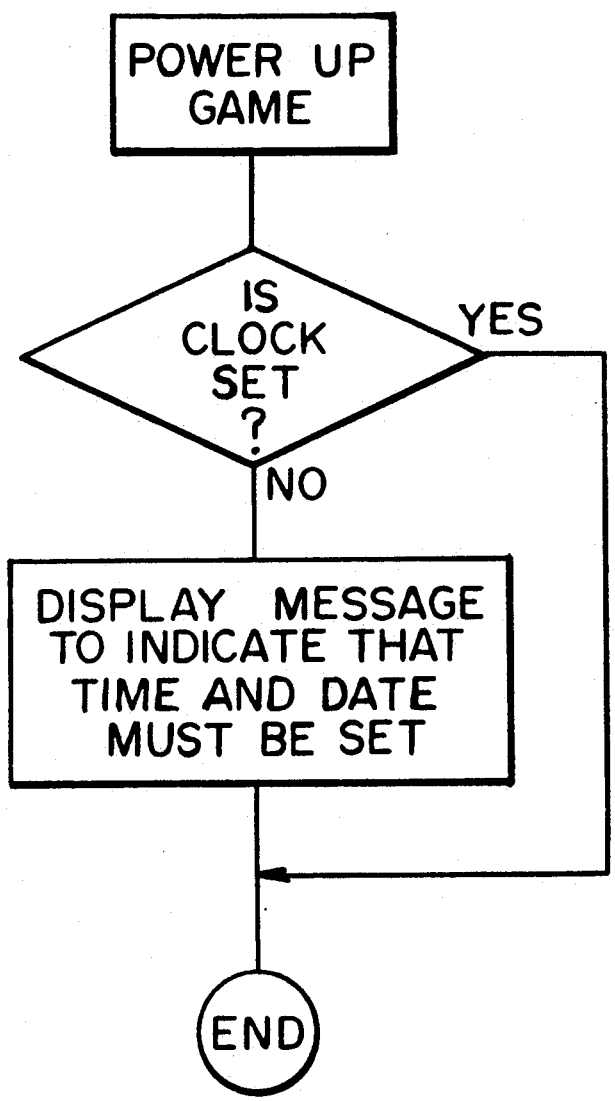
FIGS. 2-5 are flow diagrams useful in explaining various aspects of the operation of the present invention.

FIG. 2 is a flow diagram useful in explaining how the microprocessor prompts the game owner to set the real time clock when the game is initially installed. Upon power-up, the microprocessor determines whether the real time clock is set. If not, the microprocessor prompts the user via user interface 12 to input the correct time and date information.

Figure 3:
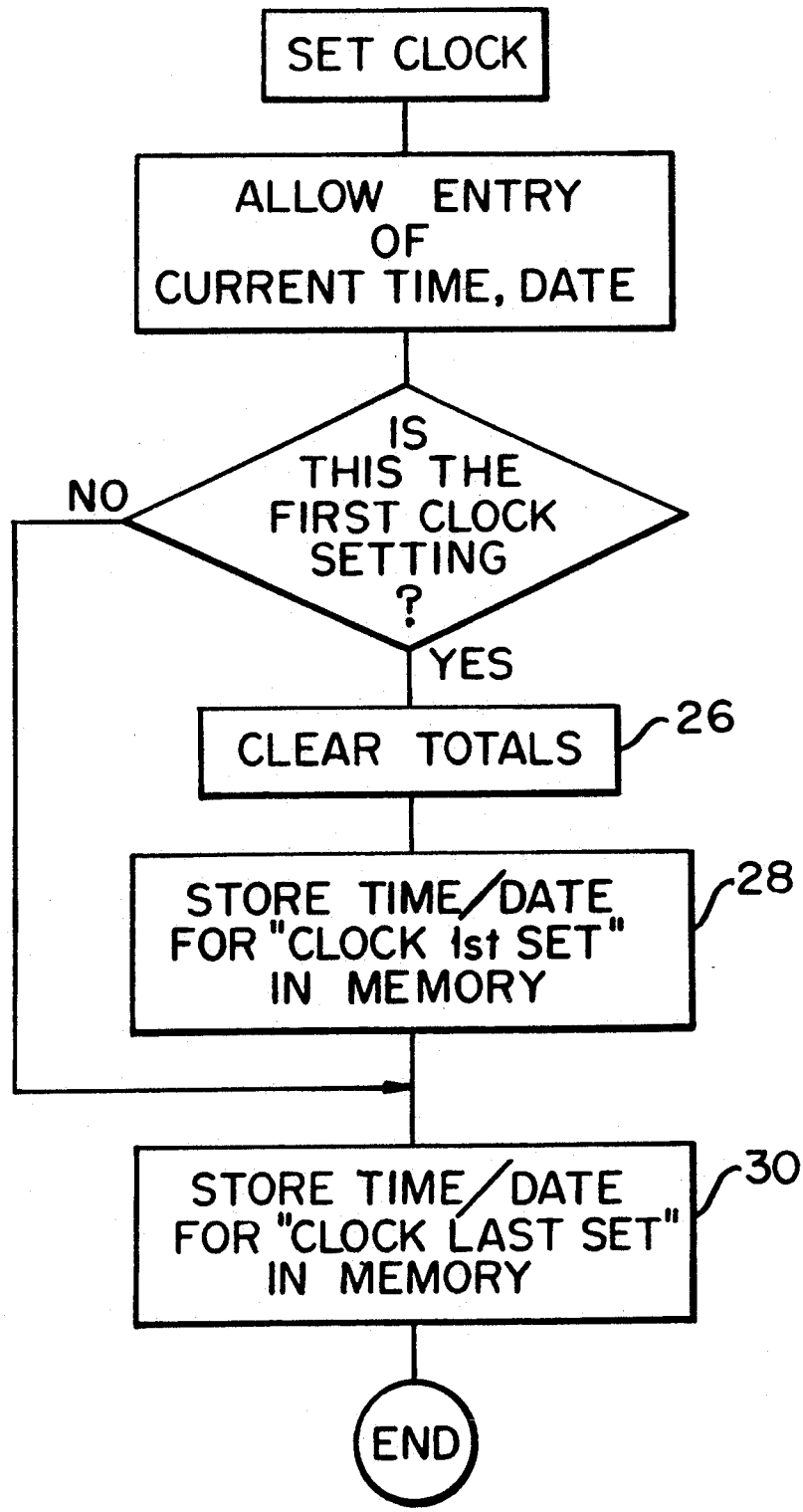

FIG. 3 is useful in explaining the operation of software routines used for setting the real time clock 20 when the game is first activated by the operator. At step 22, the microprocessor 10 prompts the operator (via the user interface 12) to set the real-time clock with the correct time and date.

If the clock is being set for the first time, the microprocessor 10 clears all totals for number of games played, earnings, etc., (step 26) and stores the initial time and date information as the CLOCK FIRST SET datum (step 28). Finally, at step 30, the microprocessor 10 updates the CLOCK LAST SET datum. CLOCK LAST SET provides information from which the operator may determine whether tampering has occurred as will be described. It also provides information to insure audit integrity even when the clock is reset for legitimate purposes, such as when the battery backup fails, or when the time is adjusted because the equipment is moved or for daylight savings time. The operator will typically record the initial date and time that the real-time clock was set to verify information reported by the collectors.

In order to maintain the integrity of the audi information, certain information is not clearable by the collector. This information is stored in the secured memory 15, and includes total earnings, total number of games played, and the total number of free games awarded and played. The nonclearable information in a battery backed-up embodiment may generally be cleared by the operator. A means of limiting the collectors ability to clear these totals in a battery backed embodiment include locating the secured memory and its battery backup in a separately locked portion of the back box inaccessible to route collectors and technicians. In an EEPROM embodiment, of course, the information is permanently nonclearable.

Other audit information is stored in the collector-clearable memory 17. This information includes, for example the number of games played since the last collection and the revenue generated since the last collection. This information forms a set of data constituting "Clearable Totals." Other information, such as the number of free games awarded, etc., may also be recorded there. The Clearable Totals will typically be recorded manually by the collector, for later use by the operator in determining that the correct monetary receipts have been turned in by the collector. After collecting money from the machine and recording the Clearable Totals, this information may be purged by the collector to allow accrual of data for the next collection period.

The data provided by the audit system of the present invention is used by the operator to determine whether tampering has occurred, and whether the money turned over by the collector is the entire amount of revenue collected by the equipment. This procedure is described in the following paragraphs.

Figure 3A:
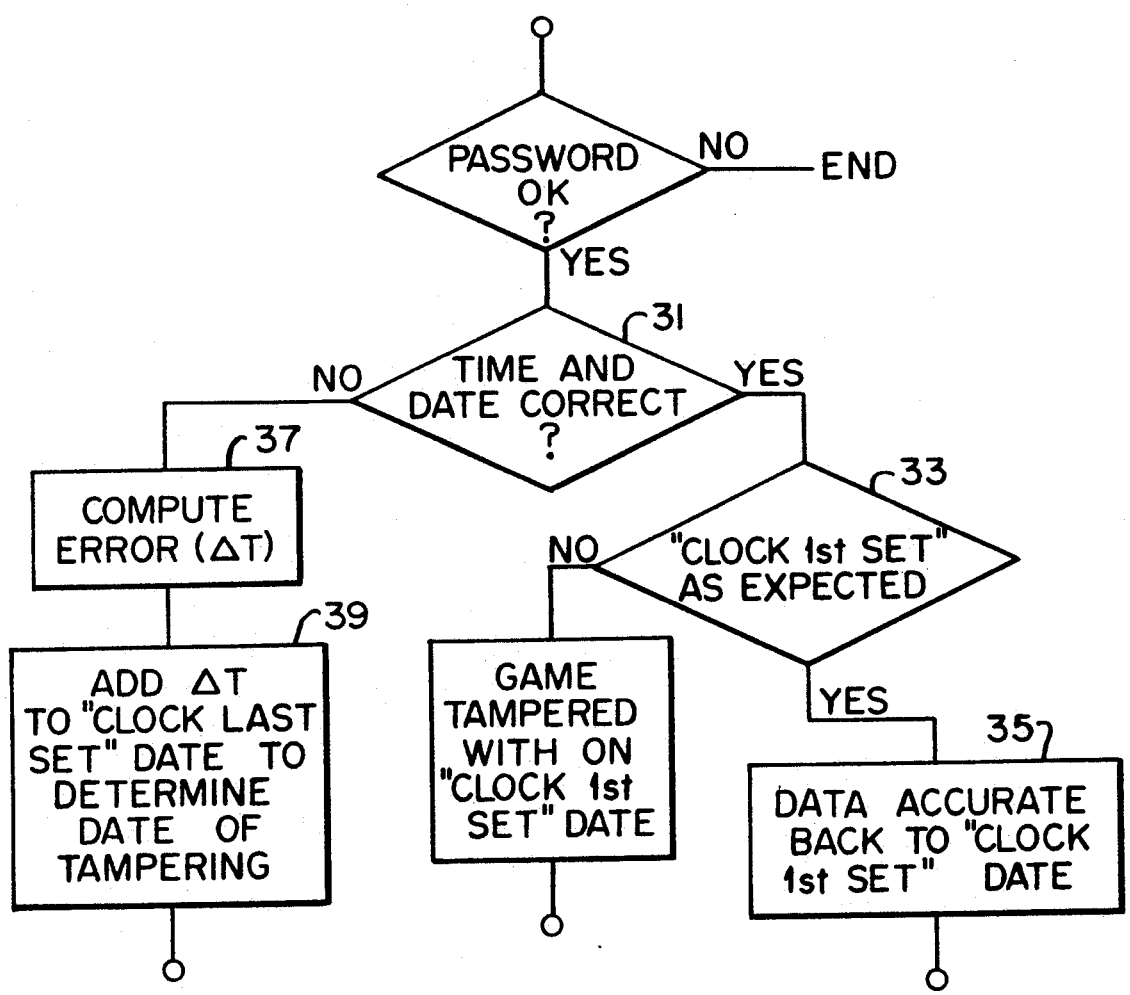

Referring to FIG. 3A a flow diagram is illustrated generally outlining the steps performed by the processor when the game operator seeks to verify the accuracy of the data reported by a route collector. The functions shown in FIG. 3A can be implemented as subroutines in a program stored in the processor memory. Access to these routines can be controlled by password protection or other security means as desired. Alternatively, it is entirely feasible to achieve the objects of the present invention by the operator simply using the functions indicated in FIG. 3A as a checklist as he steps the audit system through its readout. That is, the operator simply reviews the data indicated at each step in FIG. 3A and determines whether, for example, the game shows the correct date. If so, he continues as indicated at 33, if not, he continues as indicated at 37 as described hereafter.

For illustrative purposes, FIG. 3A shows a password requirement in order to initiate the operator audit integrity routine. In a software driven embodiment, after correct entry of the password, the operator would be prompted to indicate if the time and date are correct (Step 31). If so the computer next displays the CLOCK FIRST SET date and prompts the operator to indicate if this corresponds with the date when in fact the clock was first set using the routine illustrated in FIG. 3 (Step 33). If the CLOCK FIRST SET date in the computer matches the operator's information then the data contained in the audit system has not been tampered with and can be relied on as accurate for the period from the CLOCK FIRST SET date to the date of the inquiry (Step 35).

If the CLOCK FIRST SET date is not as expected in Step 33, this indicates that the audit information was tampered with on the CLOCK FIRST SET date contained in the computer. Presumably a dishonest collector has reset the clock using the routines illustrated in FIG. 3 with Steps 26 and 28 without authority. From the date of tampering, it is then possible to identify the collector from employment records or other sources.

Returning to Step 31, if the operator determines that the game does not show the correct date, the processor will then request entry of the correct date. The difference, $\Delta T$ is calculated as indicated in Step 37 by adding $\Delta T$ to the CLOCK LAST SET date. From this information the date of tampering can be determined (Step 39). It will be recognized, of course, that Steps 37 and 39 need not be programmed as they can be manually computed by the operator.

By way of example, if on Sep. 1 a game shows a date of August 1 and the CLOCK LAST SET date is Mar. 1, then the game was tampered with on Apr. 1. This is determined by computing a $\Delta T$ of one month between reality (Sep. 1) and the date the computer displays (Aug. 1). The $\Delta T$ is then added to the CLOCK LAST SET date to determine when tampering occurred.

From the foregoing, it will be recognized that if the game has been reset without authority, in an effort to cover up pilferage, the date when the improper action occurred can be determined. If date records are kept of the persons responsible for collection of particular machines, it will be possible to immediately pinpoint the culpable person.

In addition to tracking data since the clock wa first set, the game time stands each time the collector's totals are cleared. If the CLOCK FIRST SET date checks out okay, the collector's totals are a reliable tally of data going back to the time stamped date. If the current time is correct, the operator can believe all dates back as far as when the clock was last set. Each time the money is emptied from the game, the collector may clear the audits. The game will time stamp when the audits were cleared. After the operator finds the AUDITS LAST CLEARED to be later than CLOCK LAST SET he may be certain that the clearable audit totals reflect the plays and money collected since that date. If the CLOCK LAST SET is later than the AUDITS CLEARED date, than FIG. 3A should be used to determine when tampering occurred.

Other time stamped events may be evaluated in a similar manner to verify the total number of games played, the number of free games played, the last service call, etc., to verify that only authorized actions are being taken by the collectors and other persons dealing with the equipment.

Another check is automatically set by the system, which provides a time stamp for the date that information was last reported or printed. This is useful in systems in which the totals are not automatically cleared upon reporting the stored audit information. For example, a gap may exist between the date of the last report and the date upon which the totals were last cleared. By recording the date of the last report for later display, discrepancies between audit amounts may be isolated to particular periods of time.

Figure 4:
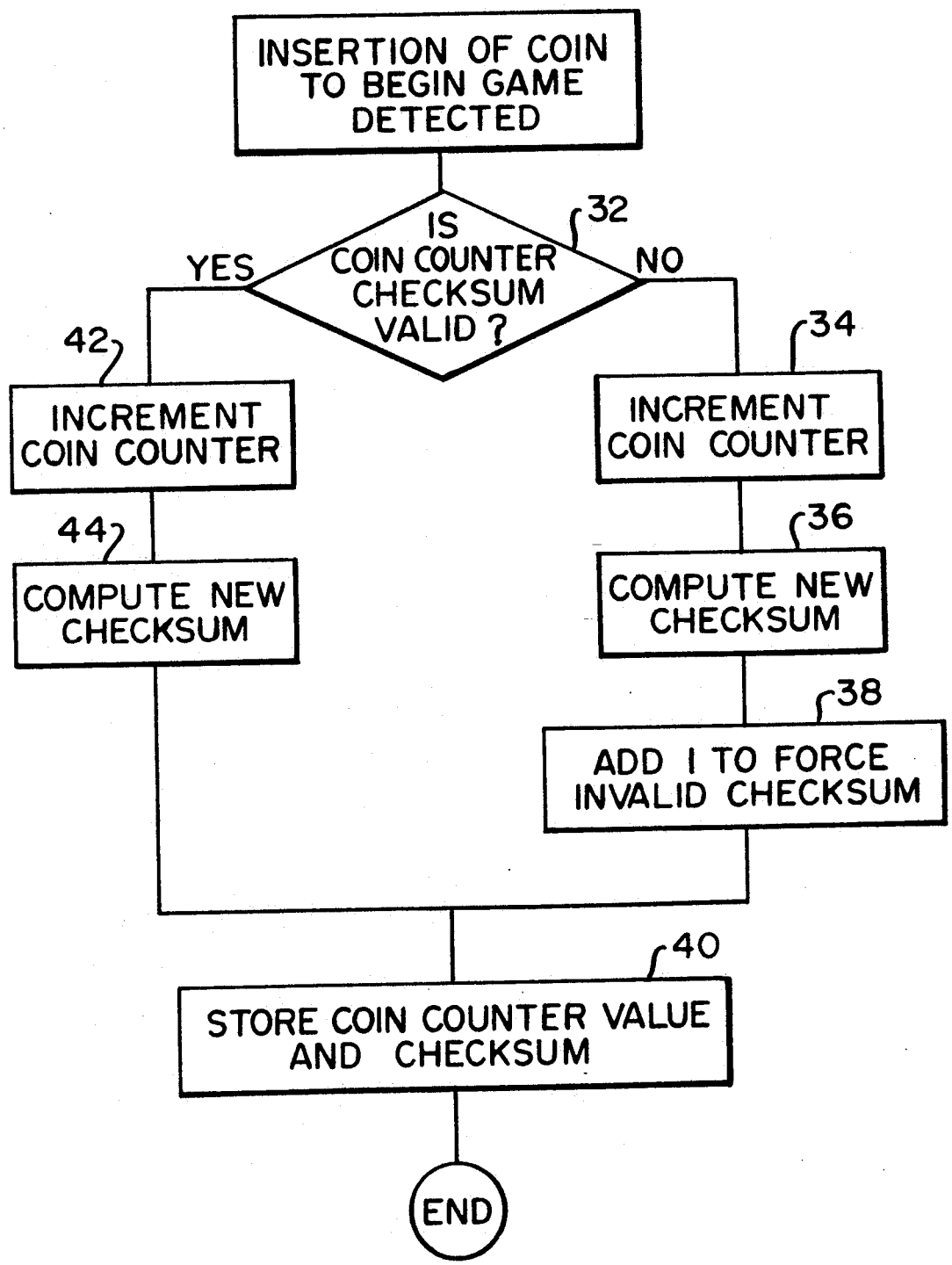

FIG. 4 is a flow diagram explaining the primary means of data collection by the audit system of the present invention. A coin counter checksum is maintained in audit memory to allow the audit system to keep track of game revenues. This checksum also contains time stamp information. At step 32, the microprocessor detects the insertion of coins to begin a game. The microprocessor 10 then checks the integrity of the coin counter checksum at step 32. If the coin counter has been corrupted, the checksum will be invalid. If the checksum is not valid, the microprocessor nevertheless increments the coin counter at step 34 and generates a new checksum at step 36. At step 38, the microprocessor 10 increments the new checksum to force it to be invalid. Finally, at step 40, the new coin counter value and checksum are stored in audit memory.

If the checksum is valid in step 32, the coin counter is incremented (step 42) and a new checksum computed (step 44). The new checksum is stored in audit memory at step 40.

In order to facilitate the reporting of information generated by the audit system, a printer port may optionally be included in the game or other equipment in association with the microprocessor and audit memory. Upon connection to a printer, an audit information report may be generated by the microprocessor including all of the above information. A menu driven system may optionally be provided to generate reports containing information specified by the user.

Additional functions not related to audit control may be implemented with the system of the present invention. One such feature is to allow the operator, via the real time clock 20, to modify the game operation during certain times or on certain days of the week. It is known in this art to adjust the difficulty level of a pinball or similar type amusement game to match the average skill level of the players at a given location. For example, U.S. Pat. No. 4,685,677, commonly assigned, teaches computer controlled variation in the award levels required to obtain a free replay. As the average scores go up, so does the score required to obtain a free replay. This patent, hereby incorporated by reference, does not contemplate altering game parameters such as pricing, replay levels, game difficulty (e.g. number of balls per game), or sound levels as a function of time of day or day of the week. Nor does it contemplate making such alterations responsive to processor detection of peak and off peak play periods.

Figure 5:
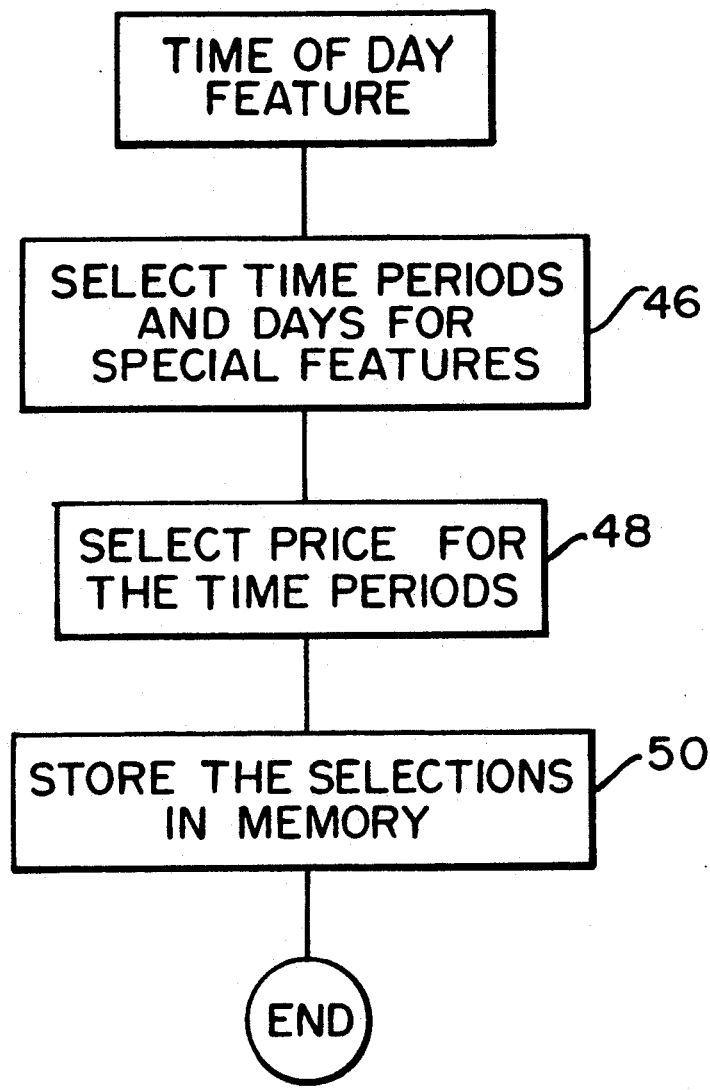

FIG. 5 is a flow diagram useful in explaining the operation of a time of day feature according to the present invention. A time of day schedule, which includes the desired modifications to the game parameters may be stored in memory in association with the time of day and/or day of the week when such changes are to be applicable. This feature is useful to the operator because, for example, it allows premium pricing during periods of heavy traffic (weekends) or reduced pricing during slow periods (e.g. week day morning).

At step 46, the operator may input the time periods or days of the week when special game pricing will be in effect. This information may be input via the user interface 12. Next, the operator inputs the price to play the game during the special pricing periods (step 48). This information is stored in memory at step 50. When the microprocessor detects the beginning of a special pricing period, the special price may be indicated on the game display.

In addition to operator programming of time of day/week variations in play features it is contemplated, according to the present invention, that the processor system will monitor the various statistics during selected time periods. From this information, the processor can determine, for example, peak and off peak time periods of play and automatically (without operator intervention) alter pricing, game difficulty, sound volume and other game parameters to maximize revenue. This is made possible by the processor's use of the real time clock to accurately record the time of occurrence of events and related data needed automatically to adjust game play to maximize player interest and operator revenue.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A coin operated, stand alone amusement game comprising:
    a) a microprocessor for controlling the game responsive to player inputs and game rules;
    b) read only memory means in which the game rules are stored;
    c) a collector clearable memory means in which selected game play statistics are stored for readout by a collector to determine the revenue generated by the game and its popularity with players;
    d) a secured memory means which cannot be cleared by the collector;
    e) resettable clock means for generating the current time and date;
    f) means for storing in said secured memory means the time and date: (i) when the clock means was last set, and (ii) each time the clearable memory means is cleared;
    g) bus means for electrically interconnecting the microprocessor to the various memory means and said resettable clock;

whereby unauthorized alteration of the statistics stored in said clearable memory means is detected.

2. The amusement game according to claim 1 wherein said secured memory means includes a random access memory and a battery pack to prevent loss of information due to power failure, said battery pack being inaccessible to said collector.

3. The amusement game according to claim 1 wherein said secured memory means includes an EEPROM.

* * * * *